United States Patent
Richins

(10) Patent No.: US 10,167,025 B2
(45) Date of Patent: Jan. 1, 2019

(54) SLIDABLE CONVEYANCE ASSEMBLY

(71) Applicant: Currentwrx, LLC, St. George, UT (US)

(72) Inventor: L. Scott Richins, Smithfield, UT (US)

(73) Assignee: CURRENTWRX, LLC, St. George, UT (US)

( * ) Notice: Subject to any disclaimer, the term of this patent is extended or adjusted under 35 U.S.C. 154(b) by 0 days.

(21) Appl. No.: 15/204,747

(22) Filed: Jul. 7, 2016

(65) Prior Publication Data
US 2016/0318558 A1 Nov. 3, 2016

Related U.S. Application Data

(63) Continuation of application No. 14/530,452, filed on Oct. 31, 2014, now Pat. No. 9,387,891.

(51) Int. Cl.
| | |
|---|---|
| *B60P 3/34* | (2006.01) |
| *B62D 33/02* | (2006.01) |
| *B60P 3/40* | (2006.01) |
| *B60P 1/00* | (2006.01) |
| *F16C 29/02* | (2006.01) |

(52) U.S. Cl.
CPC ............ *B62D 33/0207* (2013.01); *B60P 1/00* (2013.01); *B60P 1/003* (2013.01); *B60P 3/40* (2013.01); *F16C 29/02* (2013.01)

(58) Field of Classification Search
CPC ....... H01L 2924/00014; H01L 2224/48; H01L 2924/00; H01L 2924/14; B29K 2021/00; G03C 1/74; A61B 90/11; B01D 2311/04; B05C 5/008

USPC .............. 296/26.09, 171, 26.13, 26.05
See application file for complete search history.

(56) References Cited

U.S. PATENT DOCUMENTS

| | | | | |
|---|---|---|---|---|
| 2,872,261 A | * | 2/1959 | Dobbratz | A47B 1/10 384/17 |
| 5,026,176 A | * | 6/1991 | Jensen | B60R 11/06 188/67 |
| 5,344,228 A | * | 9/1994 | Kovarik | A47B 88/467 312/334.17 |
| 5,758,918 A | * | 6/1998 | Schneider | B60P 3/34 296/171 |
| 5,829,945 A | * | 11/1998 | Stanley | B60P 1/003 414/477 |
| 6,120,075 A | * | 9/2000 | Terry | B60P 1/003 224/403 |

(Continued)

*Primary Examiner* — Kiran B Patel
(74) *Attorney, Agent, or Firm* — Maschoff Brennan

(57) ABSTRACT

A device for a slidable assembly may include a support channel, defined by first, second, and third support sides and including a primary support bearing and a tertiary support bearing, and a slide channel, defined by first, second, and third slide sides and including a primary slide bearing and a tertiary slide bearing. In an assembled state, the slide channel may fit around the support channel such that the primary support bearing contacts the first slide side and the primary slide bearing contacts the first support side such that the first slide channel is configured to slide longitudinally with respect to the first support channel, and the tertiary support bearing contacts the first slide channel and the tertiary slide bearing contacts the first support channel to restrict lateral transition of the first slide channel with respect to the first support channel.

10 Claims, 12 Drawing Sheets

(56) References Cited

U.S. PATENT DOCUMENTS

| | | | | |
|---|---|---|---|---|
| 6,305,739 B1* | 10/2001 | Corona | B60P 3/34 | |
| | | | 296/165 | |
| 6,312,034 B1* | 11/2001 | Coleman, II | B60P 1/003 | |
| | | | 296/26.09 | |
| 6,318,780 B1* | 11/2001 | St. Aubin | B60P 1/003 | |
| | | | 296/26.09 | |
| 6,398,283 B1* | 6/2002 | Knudtson | B60P 1/003 | |
| | | | 296/26.09 | |
| 6,497,449 B2* | 12/2002 | Graf | B60P 3/39 | |
| | | | 296/170 | |
| 6,619,714 B2* | 9/2003 | Schneider | B60P 3/34 | |
| | | | 296/171 | |
| 6,659,524 B1* | 12/2003 | Carlson | B60P 1/003 | |
| | | | 296/26.09 | |
| 6,745,527 B1* | 6/2004 | Sherman | E04B 2/96 | |
| | | | 52/235 | |
| 6,866,316 B1* | 3/2005 | Harder | B60R 11/00 | |
| | | | 248/300 | |
| 6,883,849 B2* | 4/2005 | Hebert | B60P 1/003 | |
| | | | 224/403 | |
| 7,083,219 B1* | 8/2006 | Gregory | B60P 1/003 | |
| | | | 296/100.12 | |
| 7,121,603 B2* | 10/2006 | Stevenson | B60P 1/003 | |
| | | | 296/26.09 | |
| 7,159,917 B2* | 1/2007 | Haaberg | B60P 1/003 | |
| | | | 224/403 | |
| 7,237,817 B2* | 7/2007 | Kobylski | B60P 1/003 | |
| | | | 296/26.01 | |
| 7,240,939 B2* | 7/2007 | Vandekerkhof | B60P 3/40 | |
| | | | 296/26.09 | |
| 7,445,263 B1* | 11/2008 | Bluhm | B60P 1/003 | |
| | | | 296/26.09 | |
| 7,543,872 B1* | 6/2009 | Burns | B60P 1/003 | |
| | | | 296/26.08 | |
| 7,712,812 B2* | 5/2010 | Gagliano | B60P 1/003 | |
| | | | 296/26.09 | |
| 8,083,279 B1* | 12/2011 | Kullberg | B62D 37/04 | |
| | | | 296/26.08 | |
| 8,757,458 B2* | 6/2014 | Nebel | B60R 11/06 | |
| | | | 224/403 | |
| 8,851,300 B2* | 10/2014 | Dykstra | A47B 46/00 | |
| | | | 211/1.57 | |
| 9,227,547 B2* | 1/2016 | Williams | B60P 1/6427 | |
| 9,238,429 B2* | 1/2016 | Bluhm | F16D 63/008 | |
| 2002/0109368 A1* | 8/2002 | Mink | B60P 1/003 | |
| | | | 296/26.13 | |
| 2002/0180231 A1* | 12/2002 | Fox | B60P 3/40 | |
| | | | 296/26.01 | |
| 2004/0100388 A1* | 5/2004 | Yoshida | B60N 2/002 | |
| | | | 340/686.1 | |
| 2007/0210599 A1* | 9/2007 | Arnold | B60P 1/003 | |
| | | | 296/26.09 | |
| 2008/0157555 A1* | 7/2008 | Steele | B60P 7/08 | |
| | | | 296/26.09 | |
| 2013/0341949 A1* | 12/2013 | Bernthisel | B62D 33/0273 | |
| | | | 296/26.09 | |

* cited by examiner

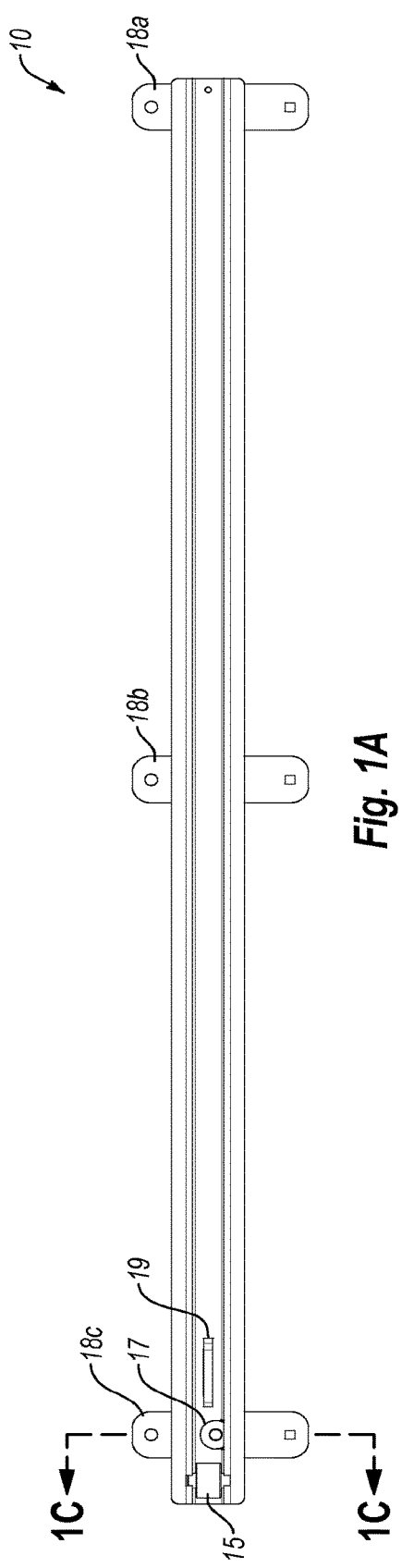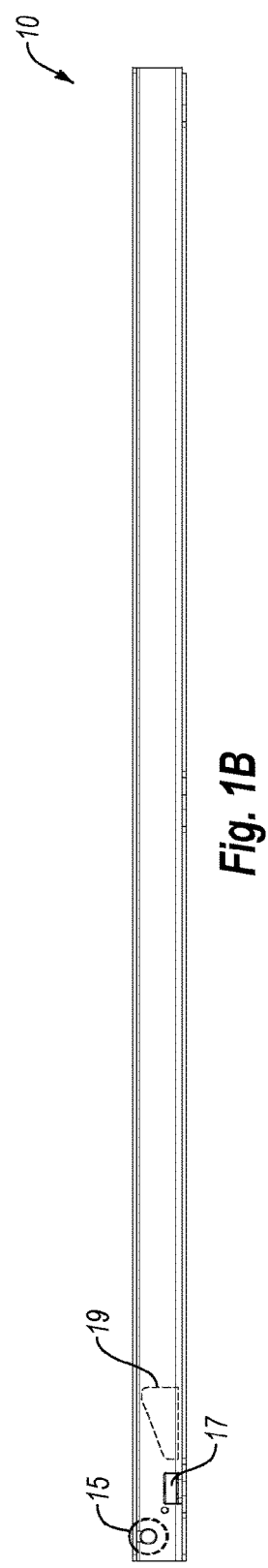
Fig. 1A
Fig. 1B

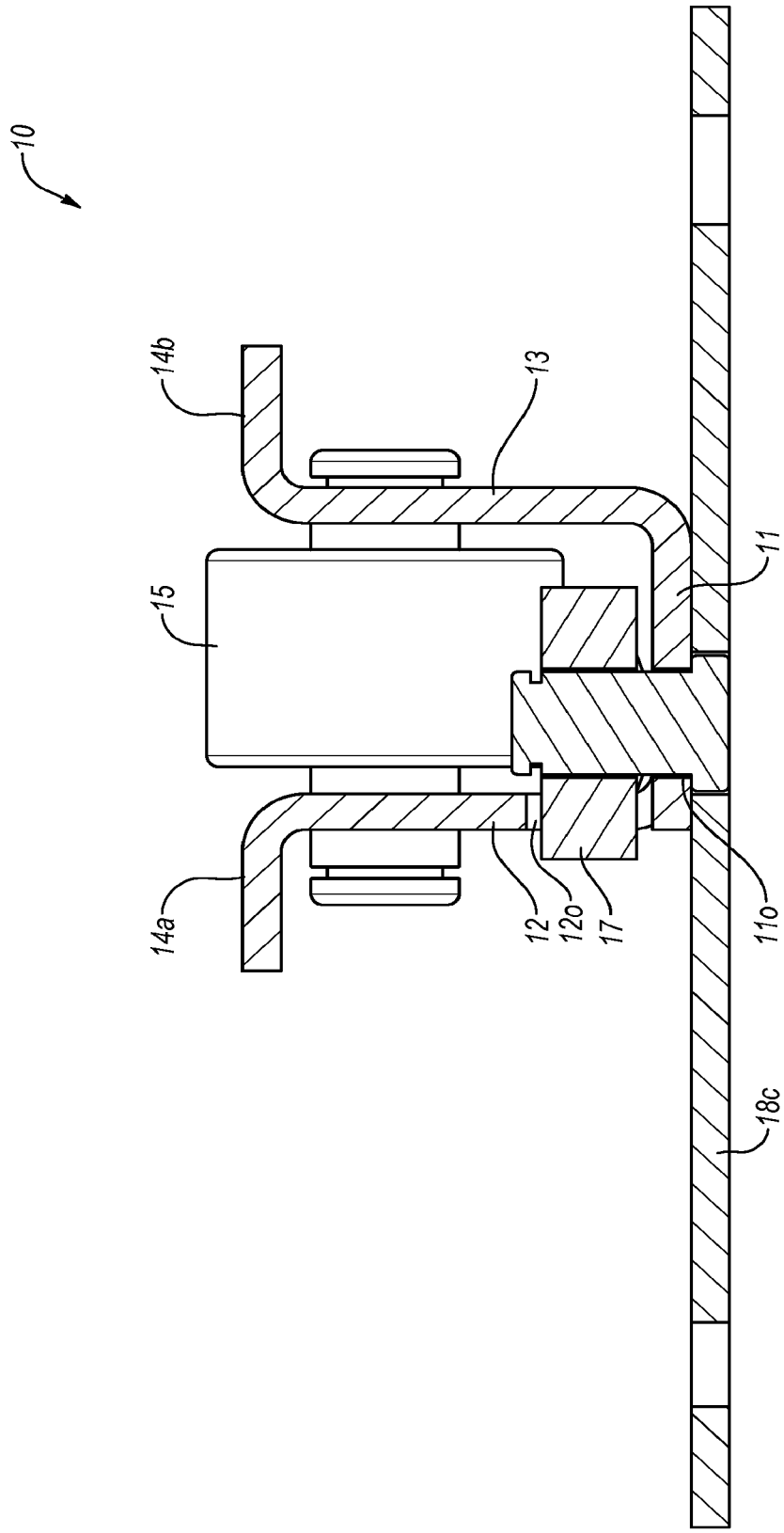

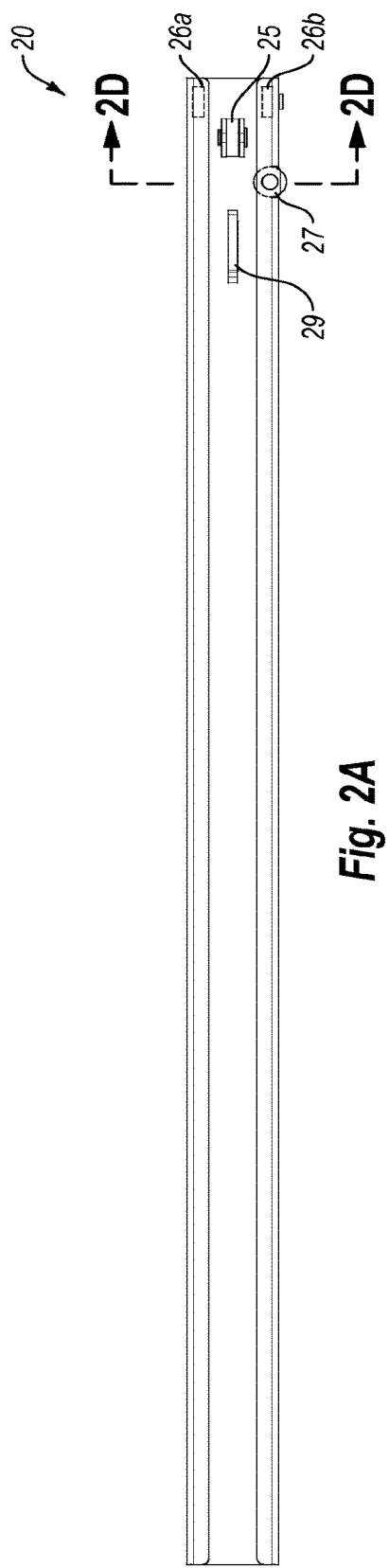
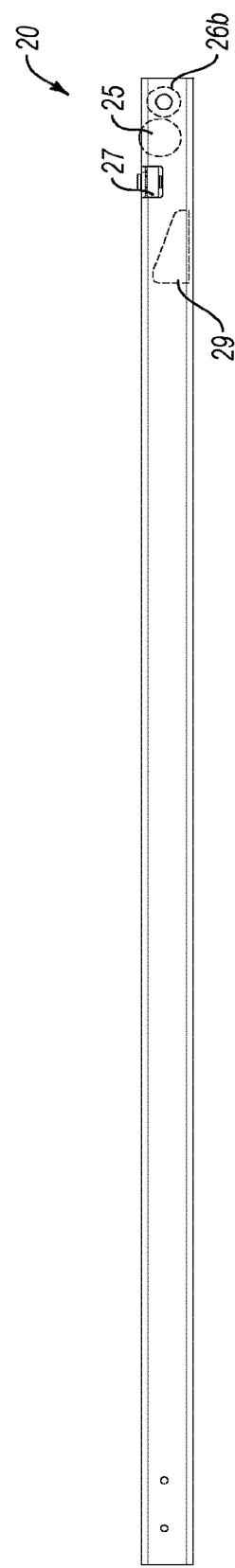
Fig. 2A
Fig. 2B

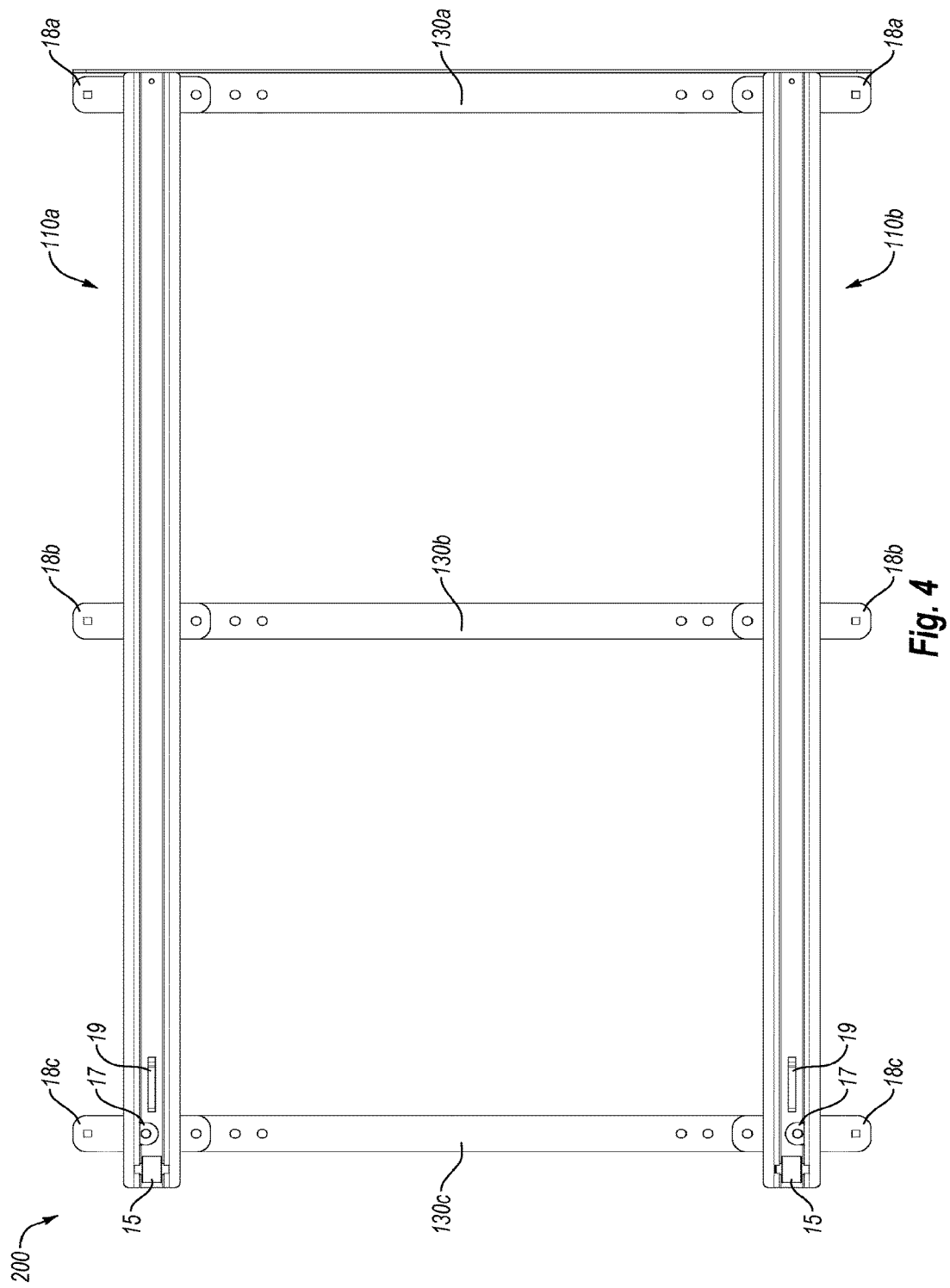

US 10,167,025 B2

SLIDABLE CONVEYANCE ASSEMBLY

CROSS-REFERENCE TO RELATED APPLICATION

This application is a continuation of U.S. application Ser. No. 14/530,452, filed on Oct. 31, 2014. The entire contents of which are incorporated by reference in the present disclosure.

FIELD

The embodiments discussed herein are related to slidable conveyance assemblies.

BACKGROUND

The installation of a slidable or extendible cargo deck conveyance assembly to the cargo beds of vehicles such as pickup trucks has been common practice to facilitate the loading and unloading of freight articles on and off the bed of the vehicles. A typical conveyance assembly includes a cargo deck, configured to fit within a cargo bed, which slidably engages with a sliding or rolling mechanism that may be fixedly or slidably coupled to the cargo bed. The cargo deck is adapted to transition in a longitudinal direction relative to the cargo bed, such that the deck may be extended from or retracted into the cargo bed. When extended from the cargo bed, fuller access is provided to the cargo deck from multiple sides, a marked improvement over the limited access to the cargo bed provided by most vehicles.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

An example embodiment may include a first support channel, defined by a first support side, a second support side, and a third support side, and including a first primary support bearing and a first tertiary support bearing. The embodiment may further include a first slide channel, defined by a first slide side, a second slide side, and a third slide side, and including a first primary slide bearing and a first tertiary slide bearing. In an assembled state, the first slide channel may fit around the first support channel such that the first primary support bearing contacts the first slide side and the first primary slide bearing contacts the first support side such that the first slide channel is configured to slide longitudinally with respect to the first support channel, and the first tertiary support bearing contacts the first slide channel and the first tertiary slide bearing contacts the first support channel to restrict lateral transition of the first slide channel with respect to the first support channel.

Another example embodiment may include a support frame having a first support channel, defined by a first support side, a second support side, and a third support side, and including a first primary support bearing and a first tertiary support bearing, a second support channel, defined by a fourth support side, a fifth support side, a sixth support side, and including a second primary support bearing and a second tertiary support bearing, and a first support cross-member. The embodiment may further include a slide frame having a first slide channel, defined by a first slide side, a second slide side, and a third slide side, and including a first primary slide bearing and a first tertiary slide bearing, a second slide channel, defined by a fourth slide side, a fifth slide side, and a sixth slide side, and including a second primary slide bearing and a second secondary slide bearing, and a first slide cross-member.

In an assembled state, the first slide channel may fit around the first support channel such that the first primary support bearing contacts the first slide side and the first primary slide bearing contacts the first support side such that the first slide channel is configured to slide longitudinally with respect to the first support channel, and the first tertiary support bearing contacts the first slide channel and the first tertiary slide bearing contacts the first support channel to restrict lateral transition of the first slide channel with respect to the first support channel. In the assembled state, the second slide channel may also fit around the second support channel such that the second primary support bearing contacts the fourth slide side and the second primary slide bearing contacts the fourth support side such that the second slide channel is configured to slide longitudinally with respect to the second support channel, and the second tertiary support bearing contacts the second slide channel and the second tertiary slide bearing contacts the second support channel to restrict lateral transition of the second slide channel with respect to the second support channel. The slide frame may slide along the support frame such that the first and second slide channels slide in unison.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1A illustrates a top view of an example support channel;

FIG. 1B illustrates a side view of the support channel of FIG. 1A;

FIG. 1C illustrates a cross-sectional view of the support channel of FIG. 1A;

FIG. 2A illustrates a top view of an example slide channel;

FIG. 2B illustrates a side view of the slide channel of FIG. 2A;

FIG. 4 illustrates a top view of an example support frame;

DETAILED DESCRIPTION OF EMBODIMENTS

Figure 2C:
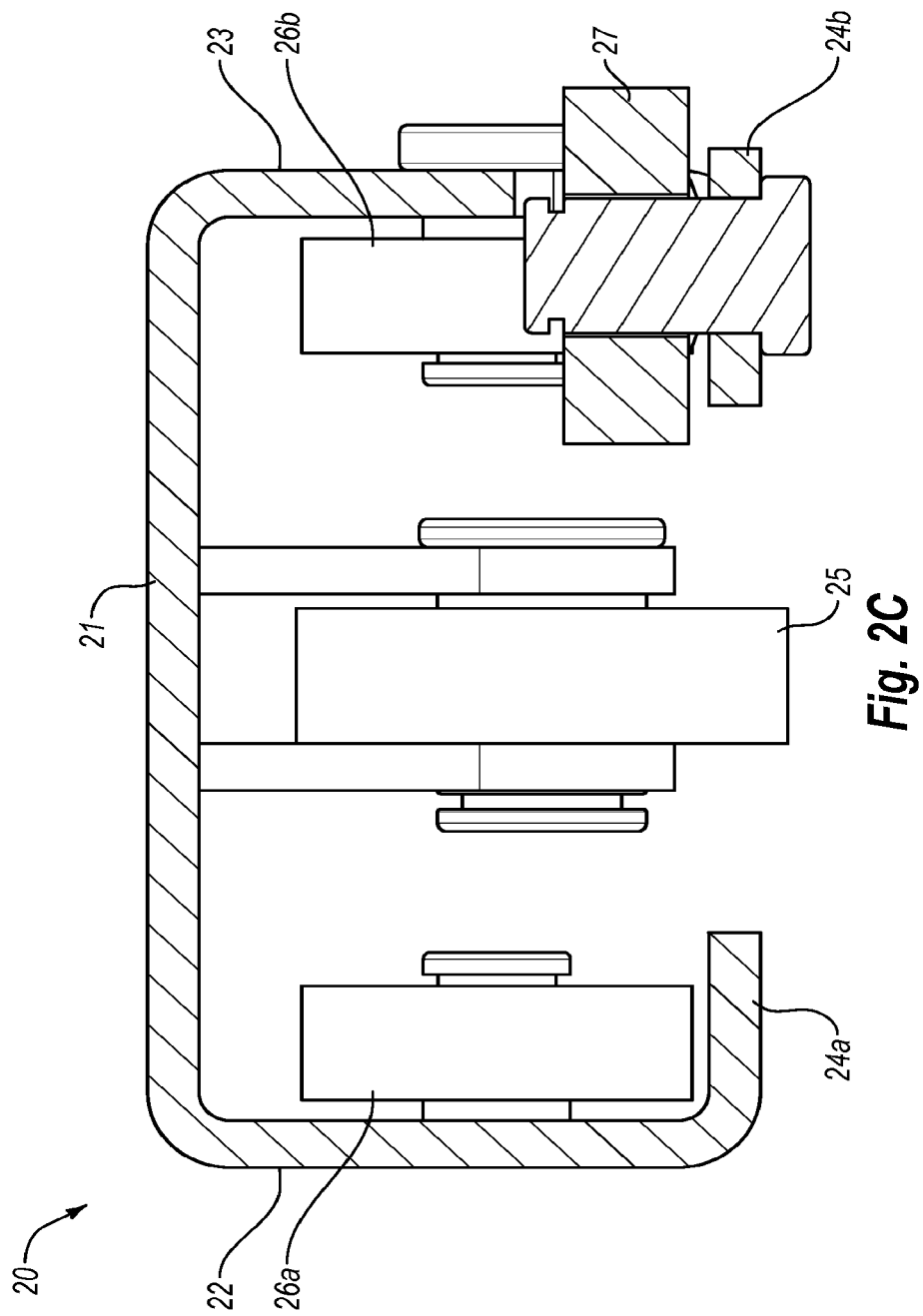
FIG. 2C illustrates a cross-sectional view of the slide channel of FIG. 2A.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

Some embodiments herein are directed to conveyance assemblies that may include a slide channel and a support channel. Each of the slide and support channels may include primary and tertiary support bearings. The primary bearings may be configured to support lateral movement of the slide channel with respect to the support channel. The tertiary support bearings may be configured to provide lateral support between the slide channel and the support channel.

Sliding or rolling mechanisms in some previous conveyance assemblies did not include lateral support to help to reduce and/or prevent a cargo deck coupled to the rolling mechanism from tilting in a lateral direction relative to the structure that housed the conveyance assemblies. In these and other assemblies, the sliding or rolling mechanisms may be coupled by permanently welding cross-members to secure the desired orientation of the sliding or rolling mechanisms in an installed state. In contrast, in some embodiments of the conveyance assemblies described herein, the tertiary support bearings may provide sufficient lateral support such that cross-members may be eliminated or fixed through a fastener (e.g., not welded) such that a footprint of the conveyance assemblies when disassembled may be smaller than other previous conveyance assemblies. A smaller footprint for a conveyance assembly may reduce storage, shipping, installment, manufacturing, and other costs, along with providing other benefits.

FIGS. 1A-1C illustrate top, side, and cross-sectional views of an example support channel 10, arranged in accordance with at least one embodiment described herein.

The support channel 10 may be defined by first, second, and third sides 11, 12, 13. The second and third sides 12, 13 may extend orthogonally from the first side 11, such that the support channel 10 may be substantially rectangular. A first flange 14a may extend from the second side 12, away from the third side 13. A second flange 14b may extend from the third side 13, away from the second side 12.

The support channel 10 may include first, second, and third fastener tabs 18a, 18b, and 18c, referred to herein as "fastener tabs 18," coupled to the first side 11. The fastener tabs 18 may be configured to receive fasteners to couple the fastener tabs 18 with support cross-members to facilitate the assembly of a support frame, described in further detail below.

The support channel 10 may include a primary support bearing 15 operably coupled to the second and third sides 12, 13 of the support channel 10. The support channel 10 may include a tertiary support bearing 17 operably coupled to the third fastener tab 18c. The tertiary support bearing 17 may extend through openings 11o, 12o defined, respectively, along the first side 11 and the second side 12. The primary and tertiary support bearings 15, 17 may be configured to contact, respectively, a first side 21 and a first flange 24a of a slide channel 20 (FIGS. 2A-2C), described in further detail below.

The support channel 10 may also include a catch member 19 configured to engage with a stop member 29 of the slide channel 20 (FIGS. 2A-2C) to help to reduce and/or prevent overextension of the slide channel 20 with respect to the support channel 10, described in further detail below.

The support channel 10 may be formed from any type or a combination of types of materials. In some embodiments, the support channel 10 may be formed from steel. In particular, the support channel 10 may be formed by roll-forming steel.

FIGS. 2A-2C illustrate bottom, side, and cross-sectional views of the slide channel 20, arranged in accordance with at least one embodiment described herein.

The slide channel 20 may include a first side 21, a second side 22, and a third side 23. The second and third sides 22, 23 may extend orthogonally from the first side 21, such that the slide channel 20 may be substantially rectangular. A first flange 24a may extend from the second side 22 toward the third side 23. A second flange 24b may extend from the third side 23 toward the second side 22.

The slide channel 20 may include a primary slide bearing 25 operably coupled to the first side 21 of the slide channel 20. The slide channel 20 may include first and second secondary slide bearings 26a, 26b, referred to herein as "secondary slide bearings 26," operably coupled to the second and third sides 22, 23, respectively, of the slide channel 20. The slide channel 20 may also include a tertiary slide bearing 27 operably coupled to the third side 23 of the slide channel 20. The primary slide bearing 25 may be configured to contact the first side 11 of the support channel 10. The secondary slide bearings 26 may be configured to contact the first and second flanges 14a, 14b of the support channel 10. The tertiary slide bearing 27 may be configured to contact the third side 13 of the support channel 10.

The slide channel 20 may further include a stop member 29, disposed along the first side 21. The stop member 29 may be configured to contact the catch member 19 of the support channel 10 to help to reduce and/or prevent overextension of the slide channel 20 with respect to the support channel 10, described in further detail below.

The slide channel 20 may be formed from any type or a combination of types of materials. In some embodiments, the slide channel 20 may be formed from steel. In particular, the slide channel 20 may be formed by roll-forming steel.

Figure 3A:
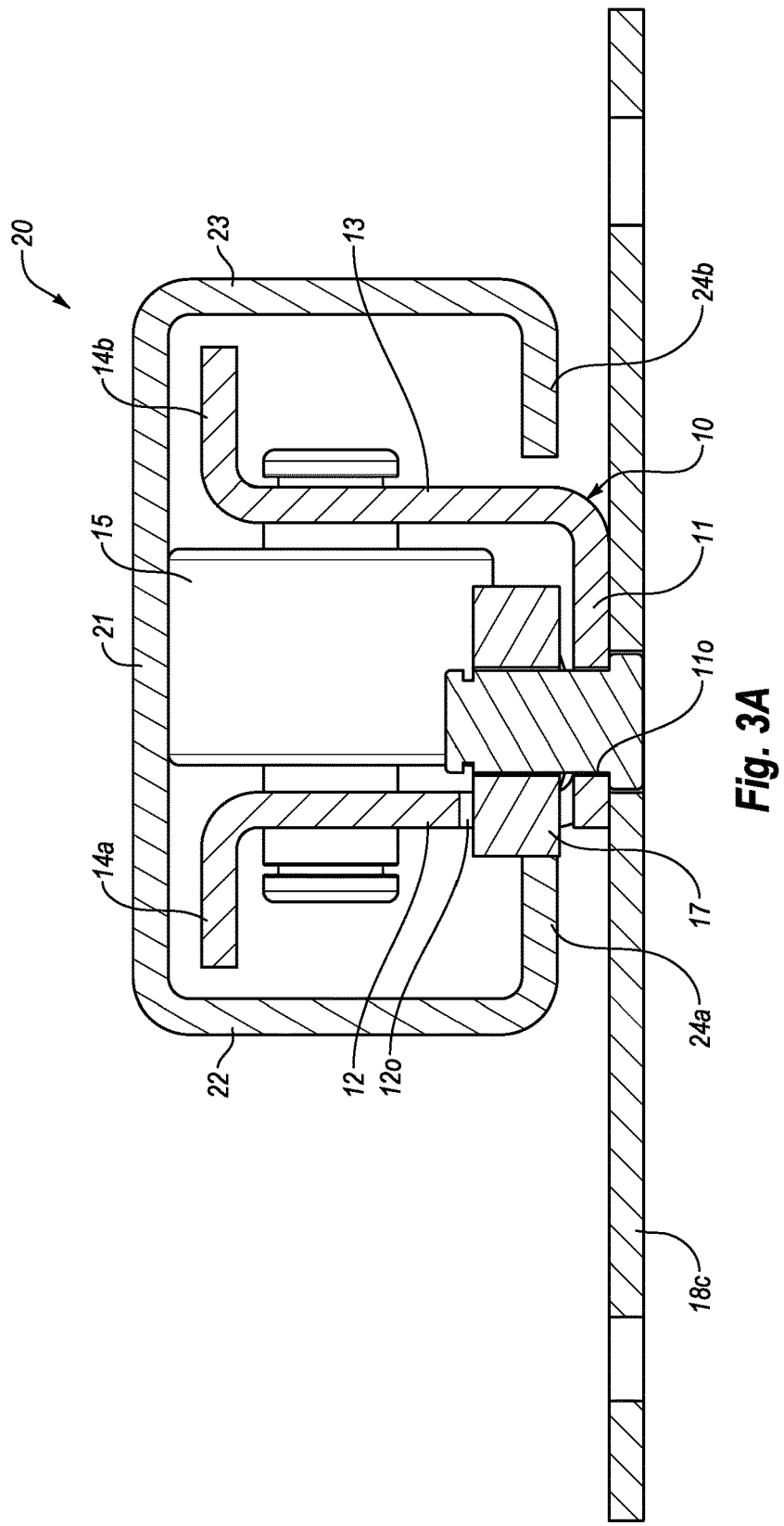
FIG. 3A illustrates a cross-sectional view of the support channel of FIG. 1A and the slide channel of FIG. 2A in an assembled state along the line 3A-3A in FIG. 6B.
Figure 3B:
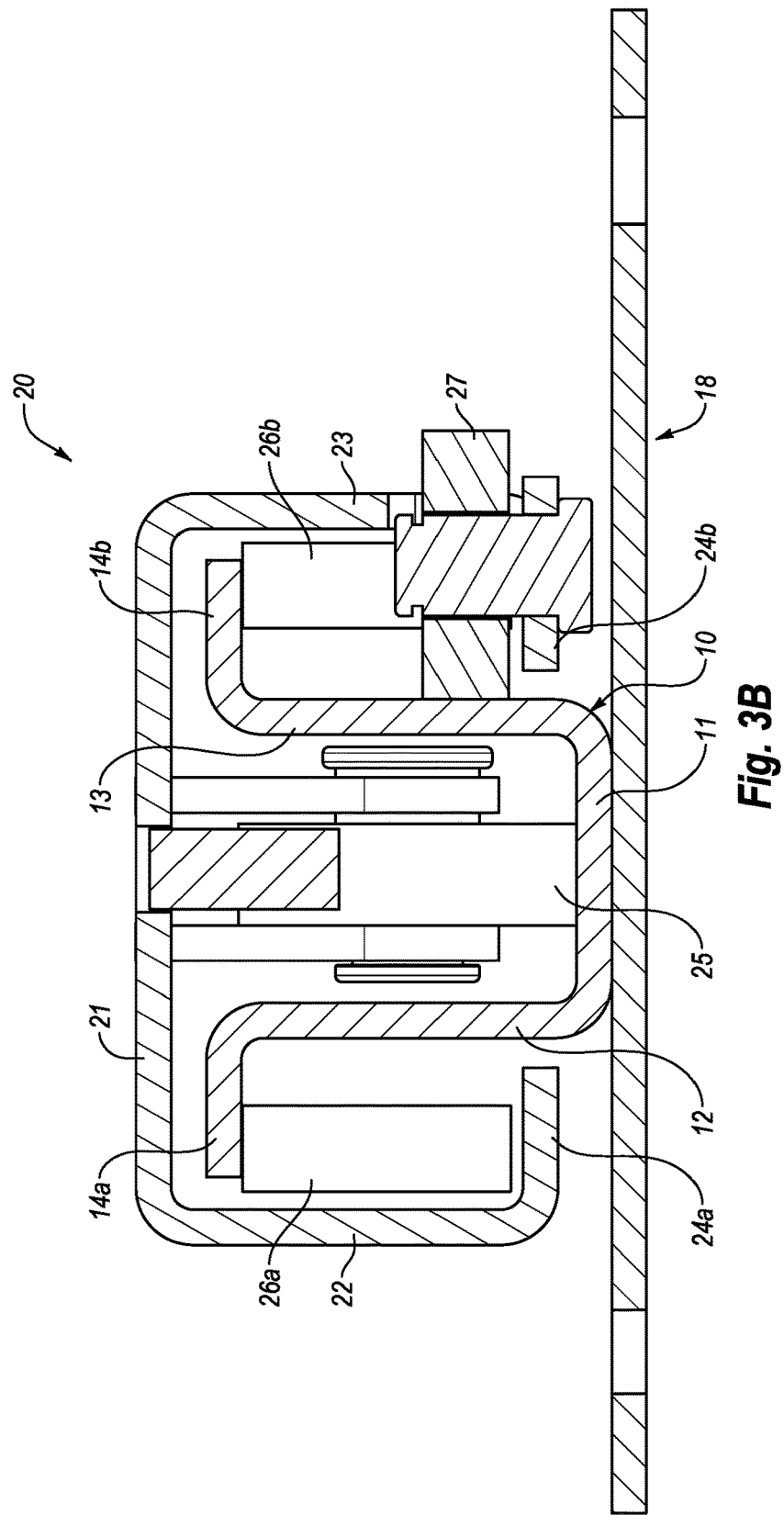
FIG. 3B illustrates a cross-sectional view of the support channel of FIG. 1A and the slide channel of FIG. 2A in an assembled state along the line 3B-3B in FIG. 6B.

FIGS. 3A and 3B illustrate cross-sectional views of the support channel 10 of FIGS. 1A-1C and the slide channel 20 of FIGS. 2A-2C in an assembled state, arranged in accordance with at least one embodiment described herein. More particularly, FIG. 3A illustrates the interactions of the primary and tertiary support bearings 15, 17 with the slide channel 20. FIG. 3B illustrates the interactions of the primary, secondary, and tertiary slide bearings 25, 26, 27 with the support channel 10. In the assembled state, the primary and tertiary support bearing 15, 17 and the primary, secondary, and tertiary slide bearings 25, 26, 27 may be located at opposite ends of, respectively, the support and slide channels 10, 20. Accordingly, the cross-sectional views of FIGS. 3A and 3B may illustrate opposite ends of the support and slide channels 10, 20 in the assembled state.

In the assembled state, the support channel 10 may be at least partially enclosed by the slide channel 20, the respective second sides 12, 22, and the third sides 13, 23 of the support and slide channels 10, 20 may be adjacent to one another, and the first and second flanges 24a, 24b of the slide channel 20 may overlap with the first and second flanges 14a, 14b of the support channel 10. The first and second flanges 14a, 14b of the support channel 10 may extend orthogonally to define a width equal to approximately the length of the first side 21 of the slide channel 20. The first and second flanges 24a, 24b of the slide channel 20 may extend orthogonally to define a space equal to approximately the length of the first side 11 of the support channel 10. Accordingly, longitudinal movement of the slide channel 20 with respect to the support channel 10 may be substantially restricted by the respective flanges 14a, 14b, 24a, 24b.

Referencing FIG. 3A, the primary support bearing 15 may contact the first side 21 of the slide channel 20 to facilitate longitudinal movement of the slide channel 20 with respect to the support channel 10. The tertiary support bearing 17 may contact the first flange 24a of the slide channel 20 to help to reduce and/or prevent lateral movement of the slide channel 20 with respect to the support channel 10.

Referencing FIG. 3B, the primary slide bearing 25 may contact the first side 11 of the support channel 10 to facilitate longitudinal movement of the slide channel 20 with respect to the support channel 10. The secondary slide bearings 26 may contact the first and second flanges 14a, 14b of the support channel 10 to further facilitate longitudinal movement of the slide channel 20 with respect to the support channel 10 and to help to reduce and/or prevent accidental or other disassembly of the slide channel 20 from the support channel 10. The tertiary slide bearing 27 may contact the third side 13 of the support channel 10 to help to reduce and/or prevent lateral movement of the slide channel 20 with respect to the support channel 10.

In the example embodiment, the roll-formed manufacture of the support and slide channels 10, 20 may allow for smoother longitudinal transition of the slide channel 20 with respect to the support channel 10. For example, the roll-formed manufacture may reduce or eliminate mil that may form in the slide channel 20 when the slide channel 20 is manufactured using other methods. The substantially rectangular shapes of the support and slide channels 10, 20 may facilitate smooth contact between the support and slide bearings 15, 17, 25, 26, 27 and the support and slide channels 10, 20, further promoting smooth translation of the slide channel 20 with respect to the support channel 10 and thereby reducing wear on the support or slide bearings 15, 17, 25, 26, 27. Alternately or additionally, the stop member 29 may contact the catch member 19 as the slide channel 20 slides along the support channel 10 to help to reduce and/or prevent overextension and/or accidental disassembly.

Modifications, additions, or omissions may be made to the support channel 10 illustrated in FIGS. 1A-1C and the slide channel 20 illustrated in FIGS. 2A-2C without departing from the scope of the present disclosure. The proportions and dimensions of the support channel 10 and/or slide channel 20 may vary. Accordingly, the dimensions or locations of the support or slide bearings 15, 17, 25, 26, 27 may vary. Furthermore, the number of support or slide bearings 15, 17, 25, 26, 27 provided on the support and slide channels 10, 20 may vary. In these and other embodiments, the catch and stop members 19, 29 may be removable to allow disassembly of the slide channel 20 from the support channel 10.

FIG. 4 illustrates a top view of an example support frame 200, arranged in accordance with at least one embodiment described herein. The support frame 200 may include first and second support channels 110a and 110b, referred to herein as "support channel(s) 110." The support channels 110 may substantially embody the support channel 10 described according to FIGS. 1A-1C. The support frame 200 may further include first, second, and third support cross-members 130a, 130b, 130c, referred to herein as "support cross-member(s) 130." The first support cross-member 130a may be coupled to the first and second support channels 110a, 110b at the respective first fastener tabs 18a. The second support cross-member 130b may be coupled to the respective second fastener tabs 18b of the first and second support channels 110a, 110b. The third support cross-member 130c may be coupled to the first and second support channels 110a, 110b at the respective third fastener tabs 18c. The support cross-members 130 may be configured to receive fasteners to facilitate fixation of the support frame 200 to a structure, such as a cargo space inside of a vehicle or other storage space. In other embodiments, the support cross-members 130 may couple to the support channels 110 using other fastener devices. In these and other embodiments, the support cross-members 130 may not be welded to the support channels 110.

Figure 5:
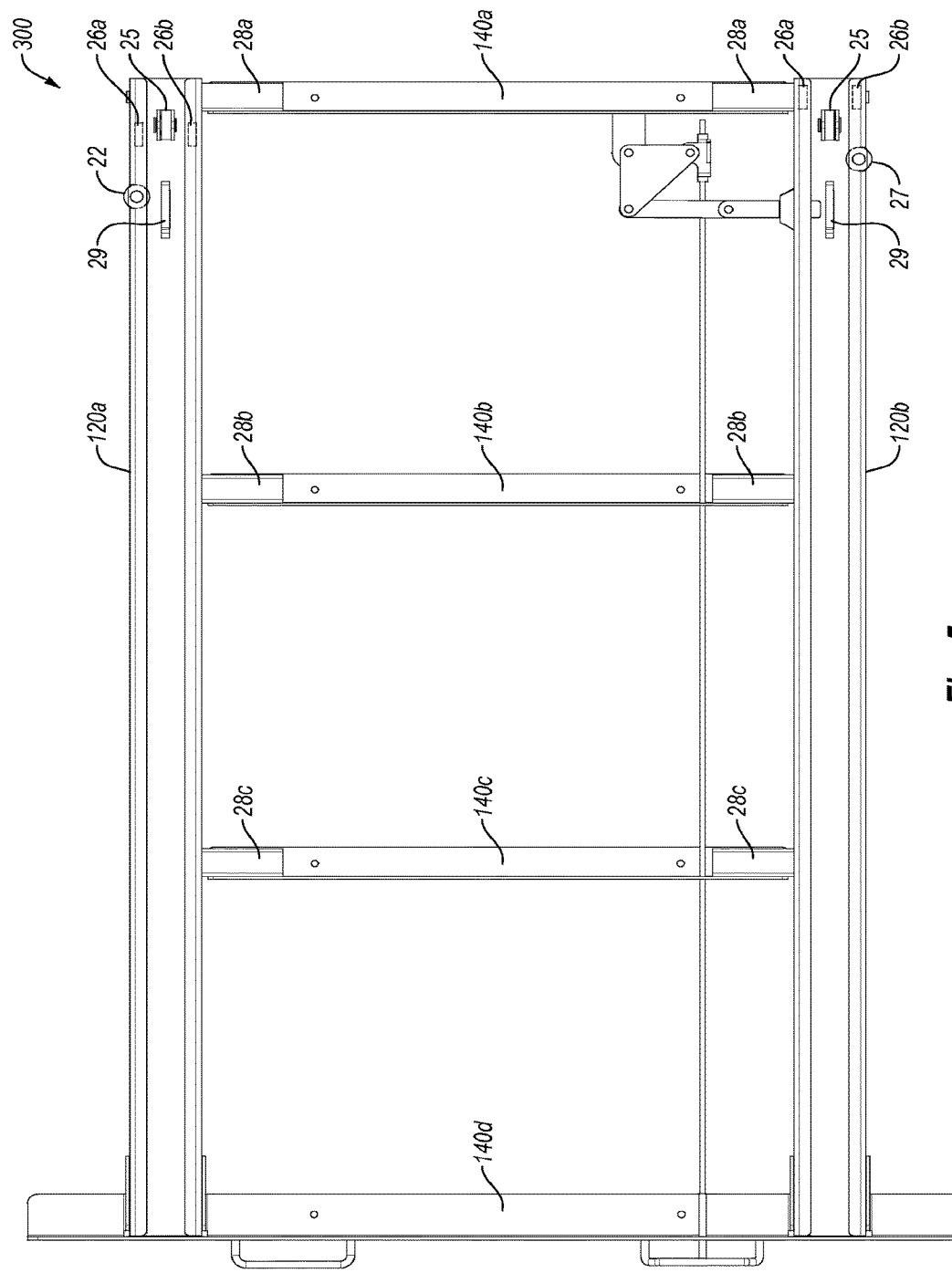
FIG. 5 illustrates a bottom view of an example slide frame.
Figure 6A:
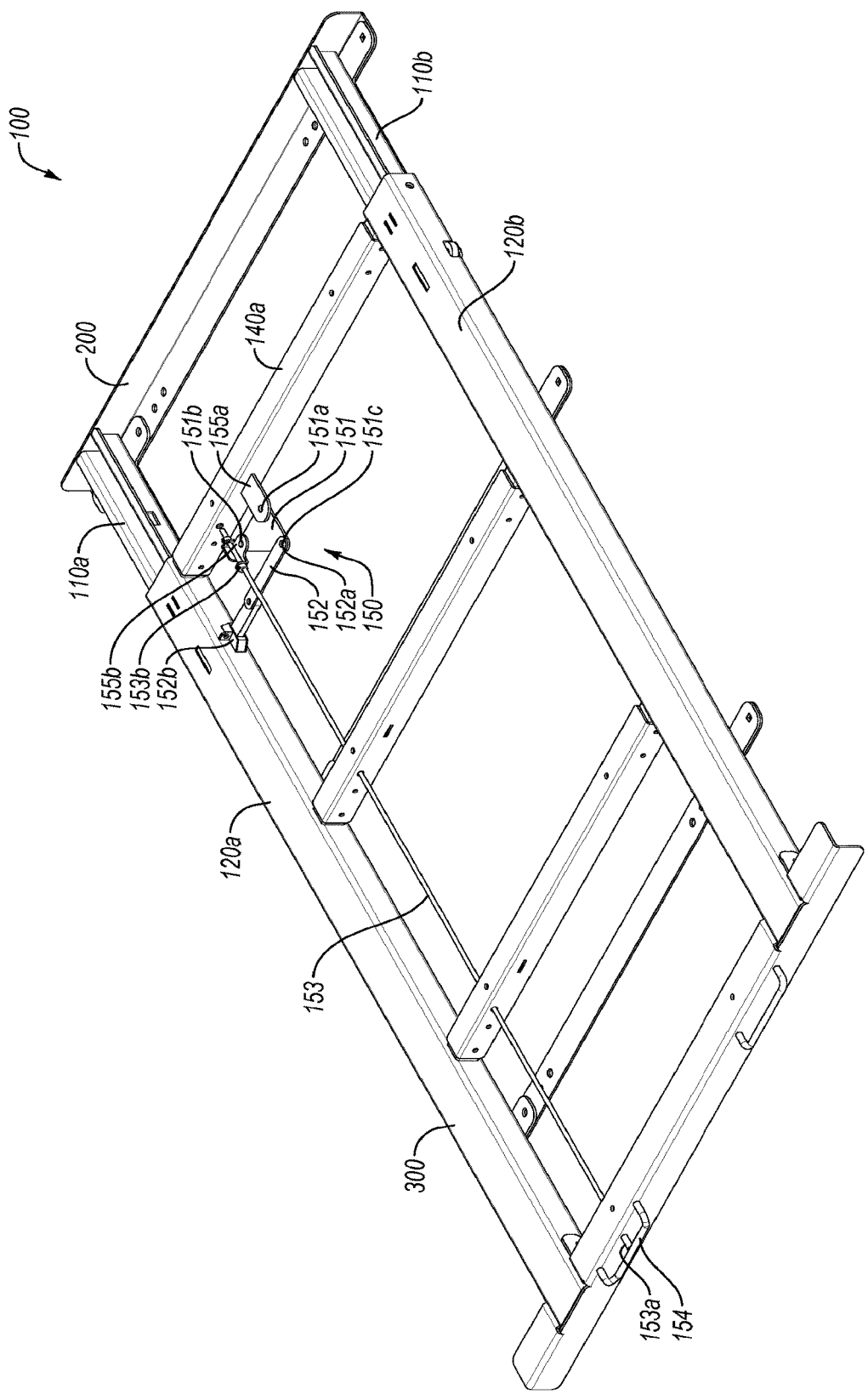
FIG. 6A illustrates a perspective view of an example slidable conveyance assembly in a partially extended state.
Figure 6B:
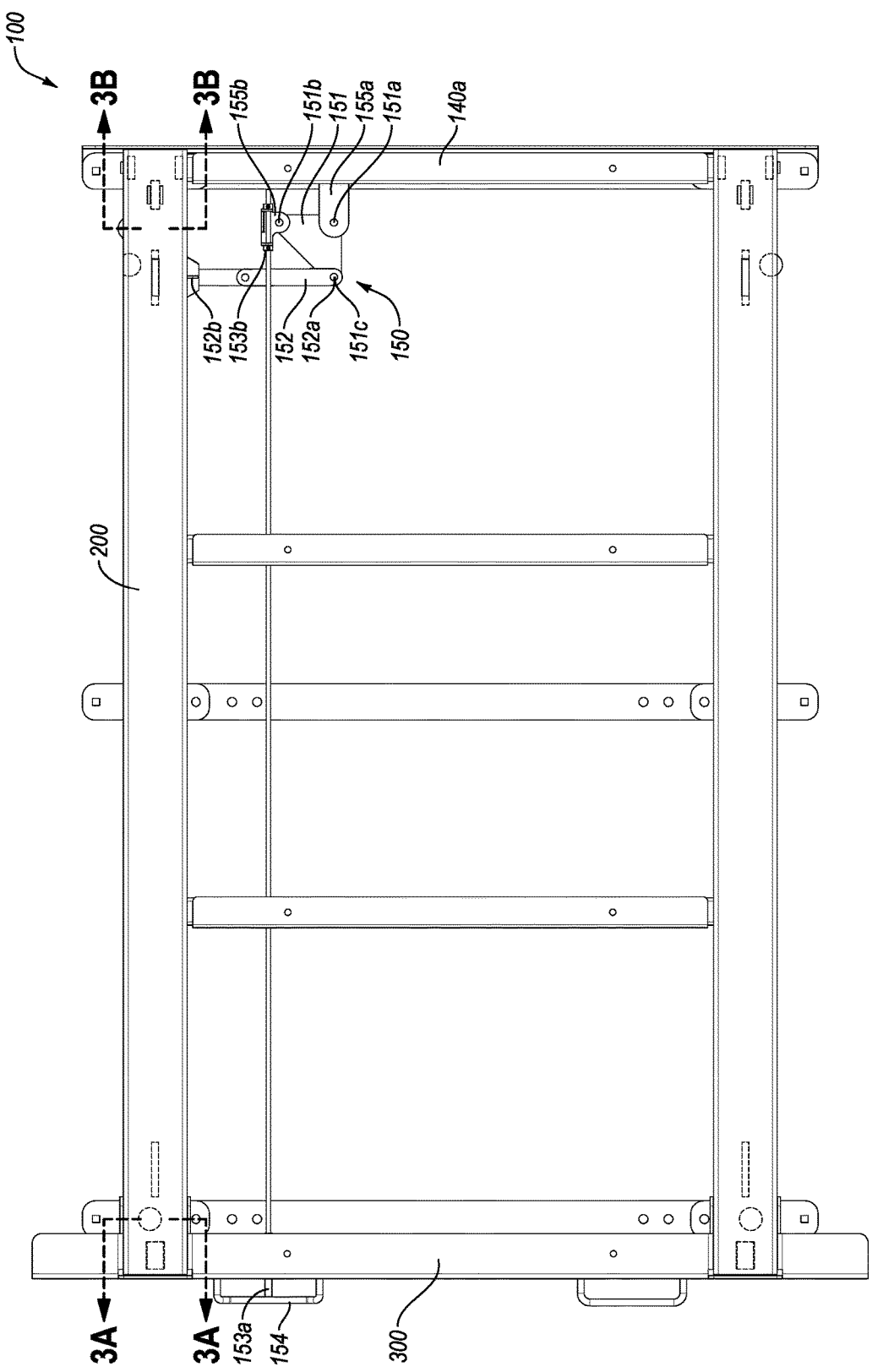
FIG. 6B illustrates a top view of the assembly of FIG. 6A in an unextended state.
Figure 6C:
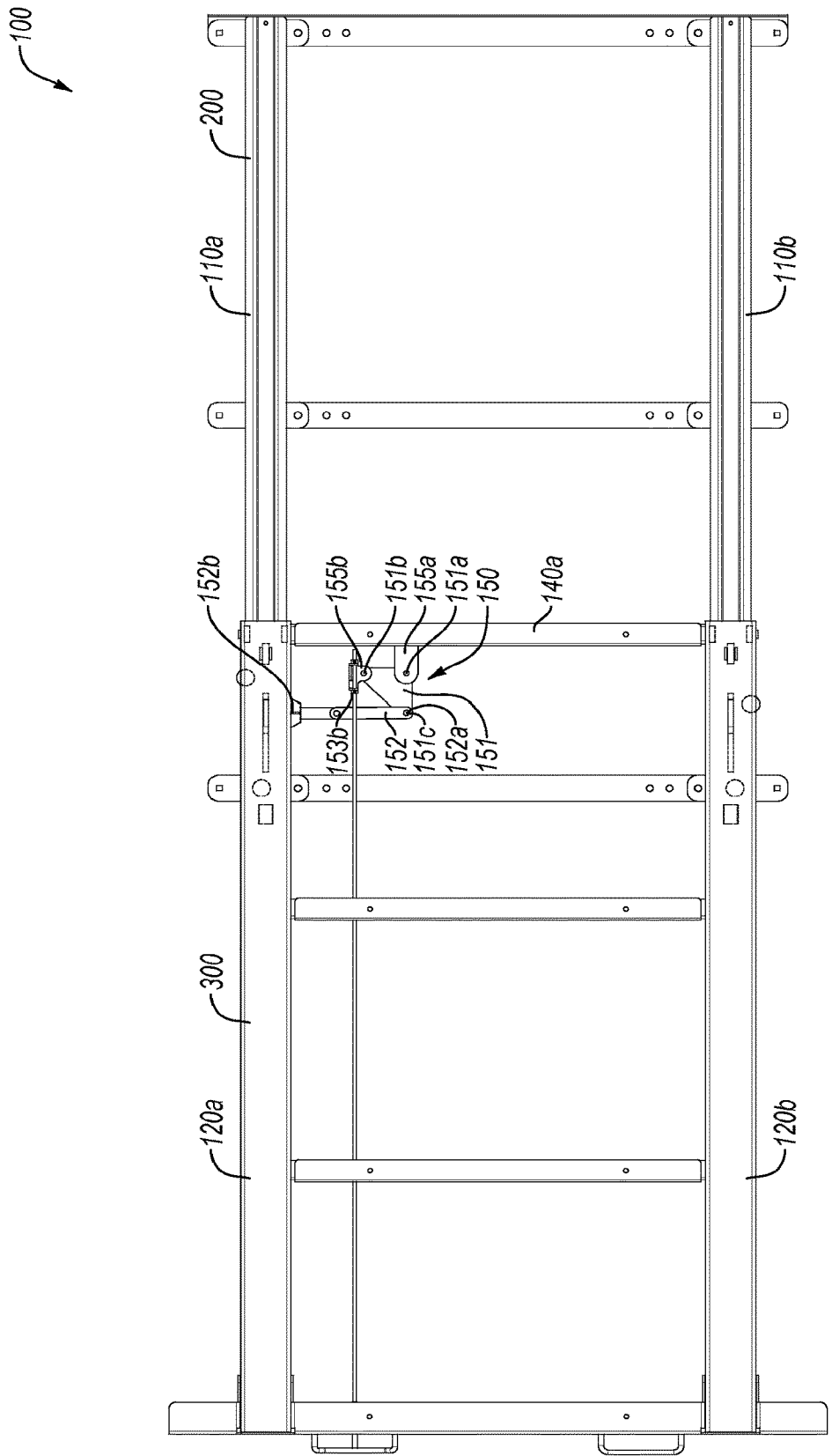
FIG. 6C illustrates a top view of the assembly of FIG. 6A in a fully extended state.
Figure 6D:
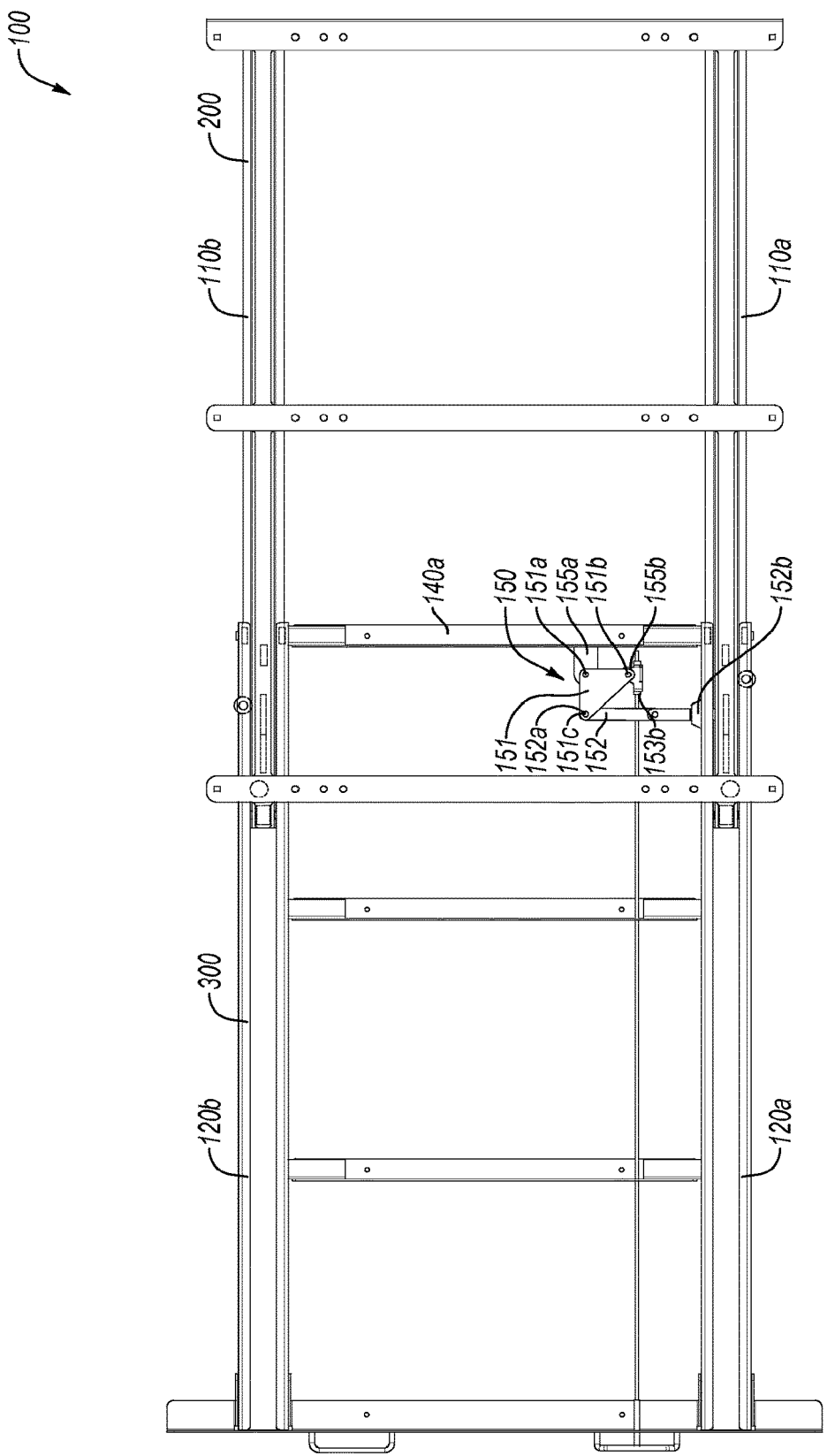
FIG. 6D illustrates a bottom view of the assembly of FIG. 6A in a fully extended state.

FIG. 5 illustrates a bottom view of an example slide frame 300, arranged in accordance with at least one embodiment described herein. The slide frame 300 may include first and second slide channels 120a and 120b, referred to herein as "slide channel(s) 120." The slide channels 120 may substantially embody the slide channel 20 described according to FIGS. 2A-2C. Each of the first and second slide channels 120a, 120b may include first, second, and third fastener tabs 28a, 28b, 28c, referred to herein as "fastener tab(s) 28," coupled to the second or third side 22, 23. The slide frame 300 may further include first, second, third, and fourth slide cross-members 140a, 140b, 140c, 140d referred to herein as "slide cross-member(s) 140." The first slide cross-member 140a may be coupled to the first and second slide channels 120a, 120b at the respective first fastener tabs 28a. The second slide cross-member 140b may be coupled to the first and second slide channels 120a, 120b at the respective second fastener tabs 28b. The third slide cross-member 140c may be coupled to the first and second slide channels 120a, 120b at the respective third fastener tabs 28c. The fourth slide cross-member 140d may be coupled to the first and second slide channels 120a, 120b at the respective proximal ends. The slide cross-members 140 may be configured to receive fasteners to facilitate fixation of an apparatus, such as a container, drawer, or shelf, to the slide frame 300. In other embodiments, the slide cross-members 140 may couple to the slide channels 120 using other fastener devices. In these and other embodiments, the slide cross-members 140 may not be welded to the slide channels 120. The slide frame 300 may be configured to support a latch mechanism, described in further detail below.

As illustrated in FIGS. 6A-6D, the slide frame 300 may slidably engage with the support frame 200 to form a slidable conveyance assembly 100 (referred to herein as the "assembly 100"). The support frame 200 may be configured to be fixed to a structure, such as a cargo space inside of a vehicle or other storage space. The slide frame 300 may be configured to slide with respect to the support frame 200 in a longitudinal direction relative to the cargo space. Furthermore, the slide frame 300 may be configured to support any apparatus, such as a container, drawer, and/or a shelf. The apparatus supported thereon may therefore be transitioned in and out of the structure by transitioning the slide frame 300.

The slide channels 120 of the slide frame 300 may be slidably engaged with the support channels 110 of the support frame 200 in an assembled state that substantially embodies the slidable engagement of the assembled state of the slide channel 20 with the support channel 10 described according to FIGS. 3A and 3B. Accordingly, the slide channels 120 may slide with respect to the support channels 110 by way of the primary and tertiary support bearings against the slide channels 120 and the primary, secondary, and tertiary slide bearings against the support channels 110. The first slide channel 120a may slide with respect to the first support channel 110a and the second slide channel 120b may slide with respect to the second support channel 110b. As a result, the slide frame 300 may slidably transition in a longitudinal direction along the support frame 200 between an unextended state (FIGS. 6A and 6B) and an extended state (FIGS. 6C and 6D), with little to no lateral movement relative to the support frame 200.

The assembly 100 may further include a latch mechanism 150. The latch mechanism 150 may include a first latch member 151 having first, second, and third corners 151a, 151b, 151c, a second latch member 152 having first and second ends 152a, 152b, a latch rod 153 having first and second ends 153a, 153b, and a latch handle 154 at the first end 153a of the latch rod 153. The first corner 151a may be rotatably engaged with a first tab 155a disposed on the first slide cross-member 140a. The second corner 151b may be rotatably engaged with a second tab 155b disposed on the second end 153b of the latch rod 153. The third corner 151c may be rotatably engaged with the first end 152a of the second latch member 152. The latch rod 153 may be manipulated by the latch handle 154 to transition the latch mechanism 150 between an engaged state and an unengaged state. In the engaged state, the second latch member 152 may transition laterally towards the first slide channel 120a; in the unengaged state, the second latch member 152 may transition laterally away from the first slide channel 120a.

The latch mechanism 150 may be configured to secure the slide frame 300 with respect to the support frame 200 such that slidable movement of the slide frame 300 with respect to the support frame 200 is restricted at certain points. In some embodiments, the first slide channel 120a may include a first slot configured to receive the second end 152b of the second latch member 152. The first support channel 110a may include one or more slots configured to align with the first slot of the first slide channel 120a as the slide frame 300 slides with respect to the support frame 200. Accordingly, at certain points along the slidable transition of the slide frame 300, the first slot of the first slide channel 120a may align with one of the one or more slots of the first support channel 110a, whereupon the latch mechanism 150 may be transitioned into the engaged state, such that the second latch member 152 extends through the slots of both the first support and slide channels 110a, 120a, thereby securing the slide frame 300 with respect to the support frame 200.

Modifications, additions, or omissions may be made to the assembly 100 illustrated in FIGS. 4-6D without departing from the scope of the present disclosure. In some embodiments, the support and slide frames 200, 300 may include fewer or more support and slide cross-members 130, 140, respectively, than those illustrated. Alternately or additionally, the support and slide cross-members 130, 140 may be disposed along the support and slide channels 110, 120 at different locations than those illustrated. In other embodiments, the assembly 100 may not include any support or slide cross-members 130, 140. In these and other embodiments, an apparatus supported by the assembly 100, such as a drawer or shelf, may be coupled to both first and second slide channels 120a, 120b of the slide frame 300 such that the first and second slide channels 120a, 120b slide along the first and second support channels 110a, 110b in unison. Alternately or additionally, in some embodiments, the assembly 100 may not include the latch mechanism 150, or may include more than one latch mechanism 150, or may include a different type of latch mechanism 150 than that discussed and/or illustrated above.

Alternately or additionally, the assembly 100 may include fewer or more support and slide channels 110, 120. For example, in some embodiments, the assembly 100 may include a single support channel 110 and a single slide channel 120. Alternately or additionally, the assembly 100 may include three or more support channels 110 and a corresponding slide channel 120 for each support channel 110 provided. In these and other embodiments, the number of support and slide channels 110, 120 provided may vary based on the required width of the assembly 100, the apparatus supported by the assembly 100, and/or the weight of the cargo to be supported by the assembly 100, among other factors.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:
1. A device, comprising:
a first support channel, defined by a first support side, and including a first primary support bearing and a first tertiary support bearing; and
a first slide channel, defined by a first slide side, and including a first primary slide bearing and a first tertiary slide bearing,
wherein, in an assembled state, the first slide channel fits around the first support channel such that:
   the first primary support bearing contacts the first slide side and the first primary slide bearing contacts the first support side such that the first slide channel is configured to slide longitudinally with respect to the first support channel; and
   the first tertiary support bearing contacts the first slide channel and the first tertiary slide bearing contacts the first support channel to restrict lateral transition of the first slide channel with respect to the first support channel.
2. The device of claim 1, wherein:
the first support channel further comprises a second support side, a third support side, a first support flange disposed along the second support side and a second support flange disposed along the third support side;
the first slide channel further comprises first and second secondary slide bearings; and
the first and second secondary slide bearings contact, respectively, the first and second support flanges such that the first slide channel is configured to slide longitudinally with respect to the first support channel.

3. The device of claim 1, wherein:
the first slide channel further comprises a second slide side, a third slide side, a first slide flange disposed along the second slide side and a second slide flange disposed along the third slide side; and
the first tertiary support bearing contacts the first slide flange.

4. The device of claim 1, wherein the first tertiary support bearing is oriented orthogonally to the first primary support bearing.

5. The device of claim 1, wherein the first tertiary slide bearing is oriented orthogonally to the first primary slide bearing.

6. The device of claim 1, wherein:
the first support channel further comprises a fastener tab; and
the first tertiary support bearing is operably coupled to the fastener tab.

7. The device of claim 1, wherein:
the first support channel further comprises a catch member disposed along the first support side;
the first slide channel further comprises a stop member disposed along the first slide side; and
in the assembled state, the stop member contacts the catch member as the first slide channel slides along the first support channel.

8. The device of claim 1, further comprising:
a second support channel, defined by a fourth support side, a fifth support side, a sixth support side, and including a second primary support bearing and a second tertiary support bearing;
a second slide channel, defined by a fourth slide side, a fifth slide side, and a sixth slide side, and including a second primary slide bearing and a second tertiary slide bearing,
wherein, in an assembled state, the second slide channel fits around the second support channel such that:
the second primary support bearing contacts the fourth slide side and the second primary slide bearing contacts the fourth support side such that the second slide channel is configured to slide longitudinally with respect to the second support channel; and
the second tertiary support bearing contacts the second slide channel and the second tertiary slide bearing contacts the second support channel to restrict lateral transition of the second slide channel with respect to the second support channel.

9. The device of claim 8, wherein:
the second support channel further comprises a third support flange disposed along the fifth support side and a fourth support flange disposed along the sixth support side;
the second slide channel further comprises third and fourth secondary slide bearings; and
the third and fourth secondary slide bearings contact, respectively, the third and fourth support flanges such that the second slide channel is configured to slide longitudinally with respect to the second support channel.

10. The device of claim 8, wherein:
the second slide channel further comprises a third slide flange disposed along the fifth slide side and a fourth slide flange disposed along the sixth slide side; and
the second tertiary support bearing contacts the third slide flange.

* * * * *